United States Patent [19]

Simmons et al.

[11] Patent Number: 5,472,541
[45] Date of Patent: Dec. 5, 1995

[54] METHOD OF APPLYING ADHESIVE TO POROUS MATERIALS

[75] Inventors: F. Arthur Simmons, Atlanta; George M. Elliott, Woodstock; Douglas D. King, Canton, all of Ga.

[73] Assignee: Astechnologies, Inc., Roswell, Ga.

[21] Appl. No.: 322,222

[22] Filed: Oct. 13, 1994

Related U.S. Application Data

[63] Continuation-in-part of Ser. No. 51,859, Apr. 26, 1993, abandoned.

[51] Int. Cl.⁶ ................................................ B32B 31/00
[52] U.S. Cl. .................... 156/231; 156/238; 156/283; 156/246; 156/311; 156/320; 427/195
[58] Field of Search ........................... 156/231, 238, 156/283, 242, 311, 320, 578, 246; 427/180, 195, 243

[56] References Cited

U.S. PATENT DOCUMENTS

| | | | |
|---|---|---|---|
| 2,995,482 | 8/1961 | Boyce et al. | 154/116 |
| 3,185,604 | 5/1965 | Cameron | 156/311 X |
| 3,761,071 | 9/1973 | Behn | 270/61 |
| 3,989,678 | 11/1976 | Furukawa et al. | 260/78 |
| 4,055,688 | 10/1977 | Caratsch | 427/19 |
| 4,139,613 | 2/1979 | Hefele | 427/197 |
| 4,264,644 | 4/1981 | Schaetti | 427/55 |
| 4,571,351 | 2/1986 | Schaetti | 427/288 |
| 4,661,198 | 4/1987 | Simmonds, Jr. | 156/578 |
| 4,698,110 | 10/1987 | Vassiliou | 156/231 |
| 4,815,660 | 3/1989 | Boger | 239/8 |
| 4,888,082 | 12/1989 | Fetcenko et al. | 156/500 |
| 4,923,555 | 5/1990 | Elliott et al. | 156/497 |
| 5,156,902 | 10/1992 | Pieper et al. | 428/206 |

FOREIGN PATENT DOCUMENTS 3402666  1/1984  Germany.

*Primary Examiner*—James Engel
*Attorney, Agent, or Firm*—Barnes, Kisselle, Raisch, Choate, Whittemore & Hulbert

[57] ABSTRACT

A method of coating the surface of semi-rigid porous materials such as open cell foam or fibrous compositions with a thermoplastic adhesive in powder form which will reactivate. The powdered adhesive in a size range of 0–600 microns will remain on the surface of such materials even when cell diameter of the foam or space between fibers is larger than adhesive particle size. High porosity is maintained in the coated product. First a thermoplastic adhesive in powder form is dispensed uniformly onto the surface of a carrier belt which is coated with a release agent and is moving continuously. The adhesive advances to a preheating station where the adhesive is plasticized and will adhere to the carrier belt to prevent movement, after which the foam or fibrous material is placed on the adhesive which is adhered to the belt. The adhesive and material advance to a second heating station where the adhesive is fully melted to allow the adhesive to bridge cells in the foam or space between fibers. The material and adhesive then advance to and through a cooling station where temperature of the adhesive and material are reduced to allow the adhesive to resolidify and the composite to release from the carrier belt and exit the machine.

6 Claims, 4 Drawing Sheets

METHOD OF APPLYING ADHESIVE TO POROUS MATERIALS

REFERENCE TO RELATED APPLICATION

This application is a continuation-in-part of application Ser. No. 08/091,859, filed Apr. 26, 1993, now abandoned.

FIELD OF INVENTION

This invention relates generally to the coating of semi-rigid, somewhat flexible materials with a thermoplastic adhesive in powder form which will reactivate and refers more particularly to a method of applying the adhesive powder in a uniform pattern to the surface of porous materials such as cellular or fibrous sheets and panels by bridging the surface of cells or fibers with the small particles of adhesive. The resultant coating of adhesive has minimal effect on porosity of materials and will permit a quality second step lamination with a minimum amount of adhesives.

BACKGROUND OF THE INVENTION

Cellular and fibrous materials coated with an adhesive which can be reactivated are used in a variety of applications. For example, automotive trim panels including headliners can be made by using an adhesive coated panel as a shell or substrate and laminating a decorative cover to the adhesive coated side of the panel. These adhesive coated panels can also be used in the manufacture of other automotive products such as floor pads, hood liners, trunk liners, seating and door panels.

Adhesives can be applied to cellular or fibrous material in many ways, including sprinkling dry adhesive powder, spraying and hot melt printing. It is important to control the amount of adhesive applied in order to avoid waste and disposal problems and also to avoid penetration of the adhesive into the cell and fiber structure of the material. Excess adhesive which finds its way into the cells and fibrous structure of the material often has an undesirable effect on the laminated composite and also increases quantity required and the cost of same.

The particle size of dry adhesive powder is usually small and when applied by sprinkling, much of the adhesive will drop into the cells or fibrous structure of the material rather than remain on the surface where it is needed to provide a second step quality lamination.

In conventional spray methods, multiple overlapping nozzles are used to provide continuous coverage. Overspray beyond the edges of the material is often considered necessary, also to insure continuous coverage. However, the use of overlapping nozzles and overspraying results in waste and disposal problems. Also, adhesive applied in liquid form penetrates into the cell and fiber structure of the material.

Methods of coating materials with adhesive are disclosed in U.S. Pat. No. 4,055,688 to Caratsch, U.S. Pat. No. 4,264,644 to Schaetti, U.S. Pat. No. 4,571,351 to Schaetti, U.S. Pat. No. 4,139,613 to Hefele and U.S. Pat. No. 4,815,660 to Boger. Caratsch (U.S. Pat. No. 4,055,688) in a first step elevates temperature of the adhesive "to its sinter temperature". The adhesive is then transferred onto the surface of a heated printing roll and as the flexible material passes between the printing roll and a contact pressure roll, the adhesive is then released onto the surface of the web material that is in contact with the printing roll.

The process disclosed in Schaetti (U.S. Pat. No. 4,264,644) uses an engraved roller to apply a specified pattern of synthetic powdered adhesive to a flexible textile material. Thermoplastic adhesive is dispensed from a supply container onto an engraved roller and the flexible textile is heated with radiant heat to a temperature sufficient to melt the adhesive and allow same to adhere to the textile and release from the water cooled printing roll.

The method disclosed by Schaettl (U.S. Pat. No. 4,571,351) for coating a flexible cloth with a synthetic powdery product dispenses powdered adhesive from a reservoir onto the surface of an engraved roller which has been preheated with non-contact radiant heaters. The cloth is brought around a second roller which applies pressure to the cloth and presses it into recesses in the engraved roller to pick up the softened adhesive.

The process disclosed in Hefele (U.S. Pat. No. 4,139,613) is for the application of thermoplastic powdered adhesive onto the outer surface of a flexible textile or foam. This process teaches a method of application of two layers of adhesive, superposed one on the other onto a flexible material. This process also uses an engraved roller or other method which provides a predetermined quantity of adhesive with a fixed pattern.

The method in Boger (U.S. Pat. No. 4,815,660) is for spraying hot melt adhesive using at least two spray guns. The spray from the nozzles of these spray guns would have to overlap making it difficult to maintain uniformity of coverage.

SUMMARY OF THE INVENTION

This invention concerns the method of applying thermoplastic adhesive in powder form to the surface of semi-rigid although somewhat flexible open or closed cell foam or fibrous materials which are constructed as by a needle punching or weaving process. The method may also be used on materials made of randomly orientated fibers which are bound together by a thermoplastic fiber, thermoplastic adhesive in the form of web, spray and powder or various latex and heat set adhesives.

In accordance with the preferred method to be described more fully hereinafter, powdered adhesive is applied to the surface of a transport belt which may be composed of a woven, glass fiber reinforced, synthetic resinous material or Kevlar® fabric and is coated with a synthetic resin such as polytetrafluoroethylene (TFE) or fluorinated ethylenepropylene (FEP) manufactured and sold by DuPont under the trademark Teflon® to seal the surface of the belt and make it "nonporous". As the powdered adhesive is dispensed very uniformly onto the belt in quantities as low as 2 grams per square foot, it is important that nothing make contact with or disturb the adhesive particles prior to the preheat station where the adhesive is preheated and "tacked" to the carrier belt before placing material to be coated on the belt in contact with the adhesive. The belt and adhesive move forward through the preheating station and by the use of conductive and/or radiant heaters, the temperature of the adhesive is elevated sufficiently to make it tacky and cause it to adhere to the Teflon® coating on the belt. As the adhesive is not fully melted in the heat station, the positioning of precut substrate material is therefore easier to accomplish.

Foam or fibrous material is placed on the adhesive coated belt and the material/adhesive composition moves forward and through a heating zone and nip rollers in which a predetermined space is required to control substrate thickness during heating. Elevated temperature in the heating zone is used to fully melt the adhesive and cause same to spread or "web" and adhere to the surface of the materials.

The belts, adhesive and material continue to move forward through a cooling station which also has a predetermined space between upper and lower cooling segments to maintain the thickness of the substrate material. Cooling will sufficiently reduce the temperature to resolidify the adhesive and enable the adhesive to remain adhered to the material and release from the surface of the Teflon® covered belt upon exit of the adhesive coated material from the machine.

The application of a water mist or vapor to the surface of the belt prior to application of the adhesive reduces the required activation temperature of the adhesive and also helps to prevent adhesive "bounce" and thereby enhances uniformity of coverage.

An object of this invention is to provide a method of applying adhesive to materials having the foregoing features.

Another object is to provide a method which employs only a few relatively simple steps, can be carried out with equipment which is inexpensive and readily available, reduces quantity and cost of adhesive and produces an end product of high quality.

Other objects, features and advantages will become more apparent as the following description proceeds, especially when considered with the accompanying drawings.

DETAILED DESCRIPTION

Figure 1:
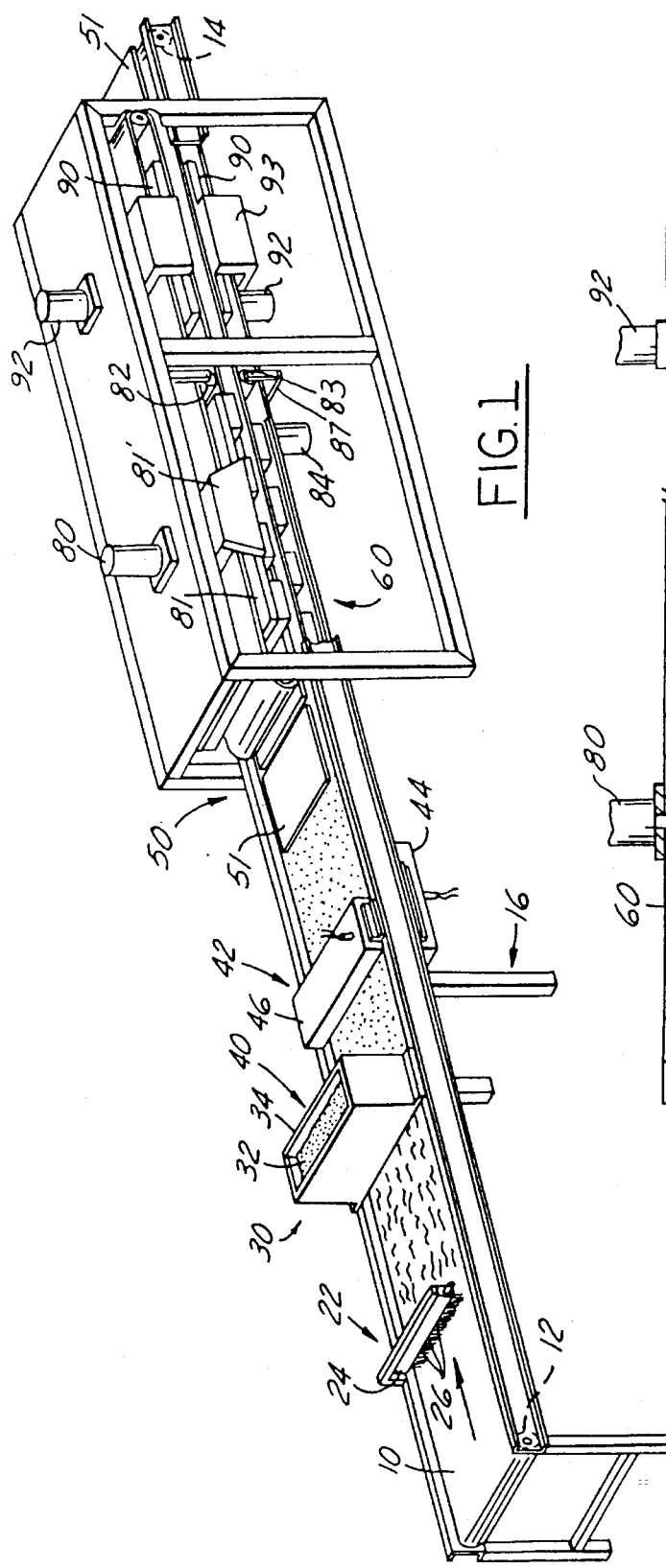
FIG. 1 is a perspective view of apparatus used in the practice of the method of this invention.
Figure 4:
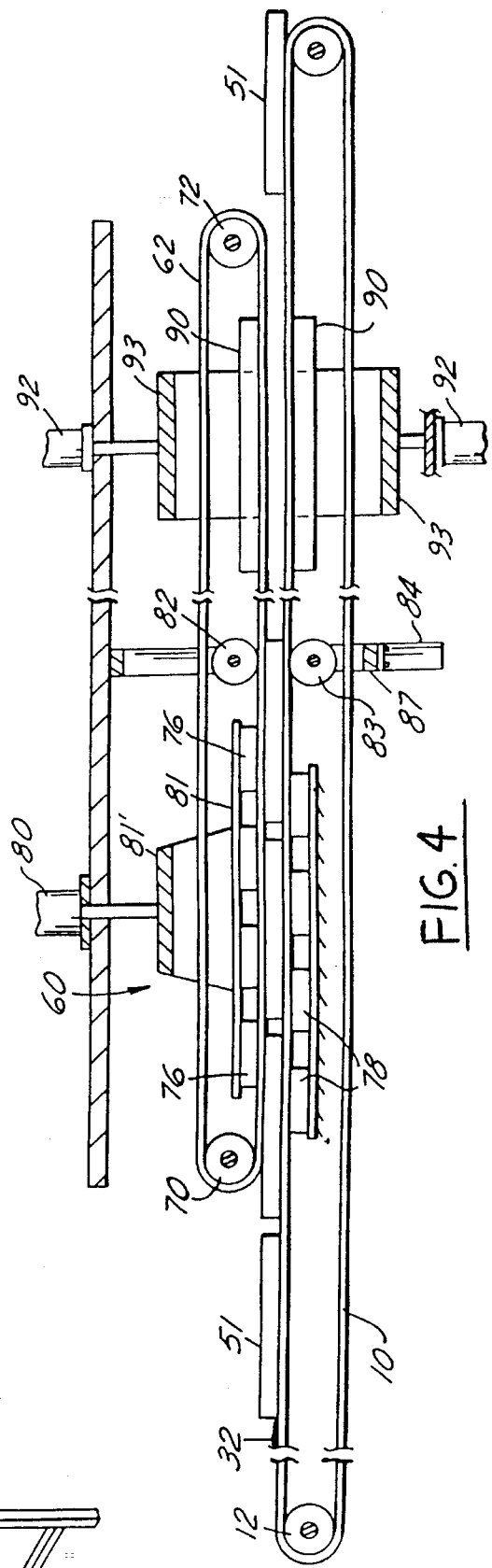
FIG. 4 is a sectional view, with parts broken away and the frame partially removed, of portions of the apparatus including the heating, cooling and unloading stations.
Figure 2:
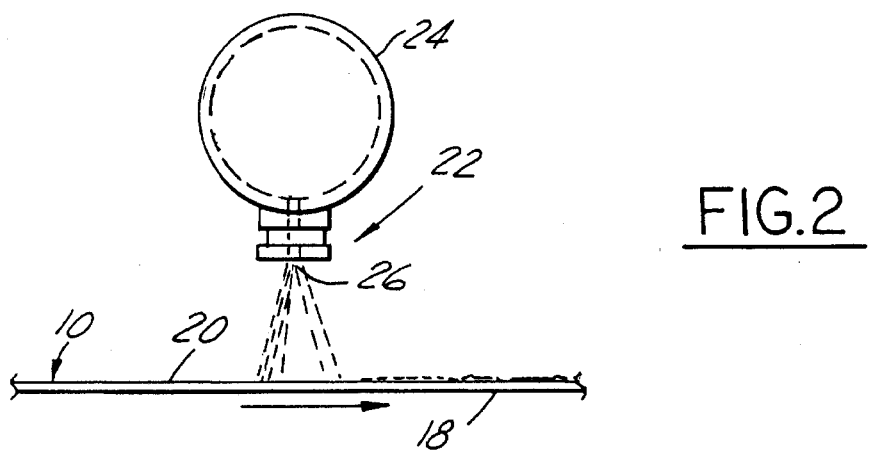
FIG. 2 is a fragmentary side elevational view of the vapor misting station showing water being sprayed on the top surface of the transport belt.

Referring now more particularly to the drawings, and especially to FIG. 1, an elongated, endless transport or support belt 10 extends over a pair of parallel, horizontal rollers 12 and 14 mounted in longitudinally spaced apart relation on a frame 16. One of the rollers is power driven to cause the belt 10 to orbit, preferably continuously, and its horizontal top run 18 to move in the direction of the arrow. The transport belt 10 is made of any suitable flexible material. The belt may, for example, be made of woven, high temperature resistant material such as Kevlar® or a glass fiber reinforced resinous plastic material and is coated on its outer surface with a suitable release agent or material, preferably polytetrafluoroethylene (TFE) or fluorinated ethylenepropylene (FEP) marketed under the trademark Teflon®. This release coating 20 (FIGS. 2 and 3) provides the belt with a nonporous surface capable of releasing plasticized adhesive which has adhered thereto, after cooling, as will become more apparent hereinafter.

There is a misting station 22 (FIG. 2) near the left end of the transport belt as viewed in FIG. 1. At this station, a water pipe 24 above the top run 18 of the transport belt extends across the full width of the belt and has spaced spray nozzles 26 on the underside which spray a predetermined volume of a fine mist of water on the top surface of the belt. The mist may be applied to the belt in varying amounts, for example, one to eight grams per square foot. The water may be taken from a standard municipal water supply line. Condensed steam vapor may also be used. The temperature of the water and of the transport belt will be maintained substantially below 212° F. at the misting station to prevent vaporation and loss of water to the atmosphere. The moisture from nozzles 26 applied to belt 10 prevents "bounce" and migration of powdered adhesive granules deposited on the belt at the next station and assists in the plasticizing of the deposited adhesive.

Figure 3:
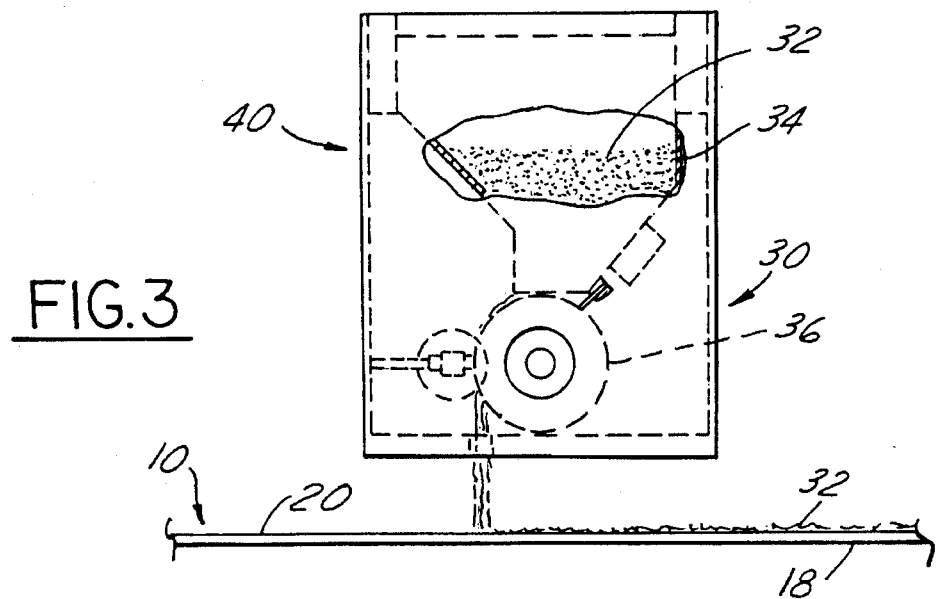
FIG. 3 is a fragmentary side elevational view showing the adhesive powder being dispensed onto the transport belt.

The top run 18 of the wetted transport belt 10 moves from the misting station 22 to the next station 30 (FIG. 3) where adhesive is applied uniformly to the top surface thereof. At station 30, powdered granules of adhesive 32 in hopper 34 are metered out of the hopper preferably onto a grooved or wire covered roll 36 and fall by gravity onto the top surface of the upper run of the transport belt 10. As shown in FIG. 3, the hopper 34 and roll 36 are parts of a dispensing unit 40 mounted in spaced relation above the transport belt 10. Other methods of dispensing the adhesive powder can be employed. The adhesive is preferably dispensed in discrete particle form in a uniform pattern over the surface of the belt in a width as required depending on the width of the material to be coated and preferably in a range of 0.5 to 60 grams per square meter, as desired. The amount of adhesive applied should be no more than needed so that there will be only minimum penetration of adhesive below the surface of the panels.

The adhesive employed in this process is preferably thermoplastic and one which will reactivate. It is preferably, but not limited to, a polyamide adhesive which will activate at about 212° F. or above. Polyesters, EVA and other thermoplastic adhesives in powder form may also be used. Excellent results may be achieved with a thermoplastic polyamide adhesive No. H005 in powder form produced by Elf-Atochem Co. which has a particle size of 0–600 microns and preferably 200–500 microns. This adhesive plastictzes at about 240° F. to 260° F. with dry heat and about 212° F. to 215° F. with vapor, that is, it becomes sufficiently tacky at those temperatures to adhere to the surface of the transport belt 10.

The next station to the right of station 30, is the preheating station 42. A conductive heater 44 is positioned beneath the upper run of the transport belt 10 and a radiant heater 46 is positioned above the upper run. Other heat supplying means may be employed, if desired. These heaters raise the temperature of the belt 10, and the moisture and adhesive thereon, to a temperature high enough to make the adhesive tacky and cause it to adhere to the belt. The adhesive is "tacked" to the belt in a uniform, non-continuous pattern in which the particles of adhesive powder remain discrete or separated and do not form a continuous film. Using the No. H005 adhesive referred to above, the temperature is raised to about 212° F. which with vapor is the tackifying temperature of the adhesive.

The transport belt 10 moves from the preheating station 42 to the loading station 50 where cut layers or panels 51 of material to be processed are positioned upon the adhesive coated top surface of the upper run of the transport belt 10. The material to be processed is porous and preferably of a fibrous material or of an open or closed cell foam material. Suitable foamed plastic materials may be made of polystyrene, urethane, polypropylene or latex. A suitable fibrous material may, for example, consist of a mix of cellulosic fibers of wood, fiberglass mat or the like and other fibers which may be thermoplastic in nature and selected from the vinyl or polyester or polyolefin families, bonded together by a suitable bonding agent. The panels 51 are preferably self-supporting and semi-rigid although somewhat flexible.

The panels 51 which have been placed on the transport belt at station 50, are advanced to a heating station 60 (FIG. 5). As shown, a second transport belt 62 may be provided to assist in advancing the panels. Belt 62 may be made of the same material as belt 10. No release agent on the outer surface of the belt 62 is needed because the adhesive will not penetrate far enough into the panels to reach the belt 62. This second transport belt 62 is positioned above the first transport belt 10 and extends over a pair of parallel, horizontal rollers 70 and 72 mounted in longitudinally spaced apart relation on the frame. The rollers 70 and 72 are parallel to the rollers 12 and 14 which support the first belt 10 and are positioned above the first belt 10 so that the bottom run of the second belt is disposed in spaced relation above and parallel to the top run of belt 10 and contacts panels on the belt 10. Thus the panels are sandwiched in a space of predetermined height between the two belts. The panel thickness is maintained by the two belts. The panels are advanced by the two belts and pressed down on the adhesive coating on belt 10. One of the rollers 70, 72 is power driven causing the second belt to orbit at the same speed as the first belt so that the two belts together advance the panels through and beyond the heating station.

At the heating station 60, there are heating segments 76 above the lower run of the top belt 62 and heating segments 78 beneath the upper run of the bottom belt 10 to apply heat to the belt, to the adhesive and to the panels being transported. The lower heating segments 78 are normally fixed and the upper heating segments 76 are mounted on a platen 81 and are adjustable vertically by any suitable means such as the air cylinder 80 to provide a preset space between the upper and lower heating elements and a predetermined amount of pressure on the transport belts and panels. The platen 81 is connected to the air cylinder 80 by a frame 81' which clears the upper run of the top belt 62. Separate air cylinders may be provided for the individual heating elements 76, if desired. If a 10 mm foam is to be coated with adhesive, a preset space of 9 mm could be provided between the belts which would impress the foam 1 mm. The temperature of the heating segments is also adjustable to provide the correct viscosity and temperature of adhesive required of the material to be coated. By controlling the temperature of the adhesive and the material, the adhesive can be effectively prevented from penetrating beneath the surface of the material, or the amount of adhesive actually penetrating can be minimized. In this heating station beyond the heating segments, pressure rollers 82 and 83 may also be used to provide additional pressure on the belts and on the panels passing between the belts which may be required for dense or tightly woven panel materials. The pressure roller 82 in this instance is on a fixed axis, and pressure roller 83 is vertically adjustable by an air cylinder 84. Roller 83 is connected to air cylinder 84 by a frame 87 which clears the lower run of bottom belt 10.

In the heating station, the adhesive coating on the belt is heated to an activating temperature which is somewhat above the minimum tackifying temperature of the preheating station 42 in order to cause the adhesive particles to soften sufficiently and become viscous enough to flatten and elongate to span or bridge the cell structure of the foam or space between the fibers. The surfaces of the panels are thus coated but not enough adhesive is used to allow more than minimal penetration of the adhesive into the body of the fibrous or cell structure of the material or minimal reduction in porosity of the material. The fact that the adhesive is merely transferred from the belt to the panels of material also reduces to a minimum penetration into the body of the panels. Using the H005 adhesive referred to above, the temperature of the adhesive and panels in the heating station may be raised to a temperature on the order of about 240° F. to 260° F. Obviously the temperature will vary depending upon the materials and adhesives used.

The panels are moved by the conveyor belts 10 and 62 beyond the heating station to a cooling station where cooling segments 90 above the lower run of the upper belt 62 and beneath the upper run of the lower belt 10 are vertically adjustable by air cylinders 92 to provide a predetermined amount of space and compression on these belts and hence on the panels being processed. The cooling elements 90 are connected to the air cylinders 92 by frames 93 which clear the transport belts. The cooling segments cool the belts, adhesive and panels to a temperature below the initial plasticizing temperature of the adhesive, in this instance substantially below 212° F., causing the adhesive to resolidify and to release from the Teflon® coated surface of the belt 10 on which it is supported and remain adhered to the material. The belt 10 advances the panels beyond the cooling station to the unloading station 93 where they may be removed either by hand or by a suitable workhandling device.

The panels after processing have a solidified adhesive coating on one surface which, when reheated to an activating temperature, can be adhered to another panel or to a decorative trim cover layer, for example. As stated above, automotive trim panels such as headliners can be made by using the adhesive coated panel of this invention as a shell or substrate and laminating a decorative cover to the adhesive coated side of the panel.

The process of this invention is not limited to a particular cell structure or density of foam, type or composition of textile fibers and/or micron size of the adhesive powder.

Figure 5A:
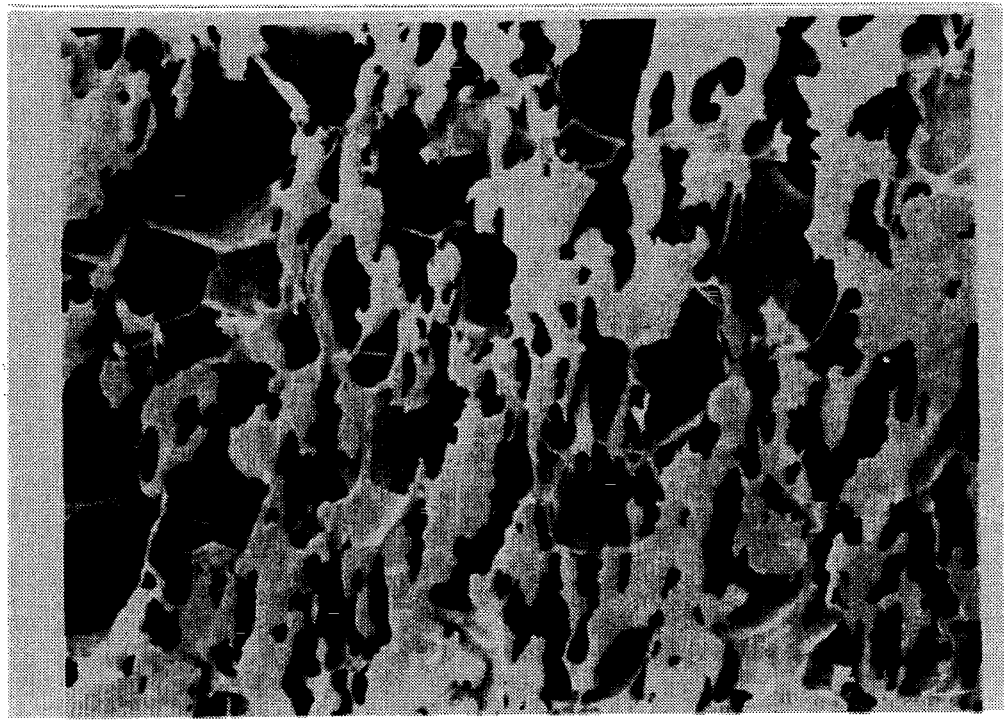
FIG. 5A is an enlarged photographic view of foam material to which powdered adhesive has been applied by the process of this invention.

FIG. 5A is an enlarged photographic view of foam material to which powdered adhesive has been applied by the process of this invention. The adhesive used in this photograph initially had a particle size in the range of 100 to 500 microns. It will be noted that the adhesive (light colored areas) remains on the surface of the foam, does not appreciably enter the cell structure of the foam, and will provide a quality product to which a second panel or sheet may be adhered in a subsequent laminating process. The adhesive was applied in the amount of approximately 30 grams per square meter.

Figure 5B:
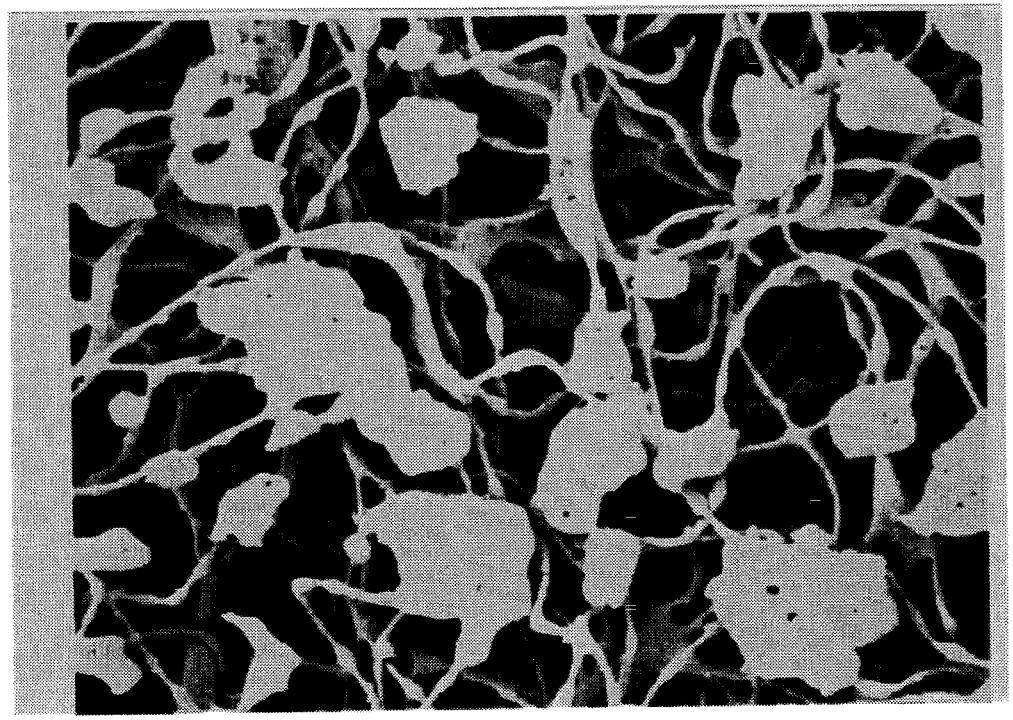
FIG. 5B is an enlarged photographic view of fibrous material to which powdered adhesive has been applied by the process of this invention.

FIG. 5B is an enlarged photograph in which the same adhesive powder was applied in the same amount by the process of this invention to a panel made of fibrous material.

Again, it will be observed that the adhesive (light colored areas) remains essentially on the surface of the fibrous material to provide good lamination characteristics.

Figure 6A:
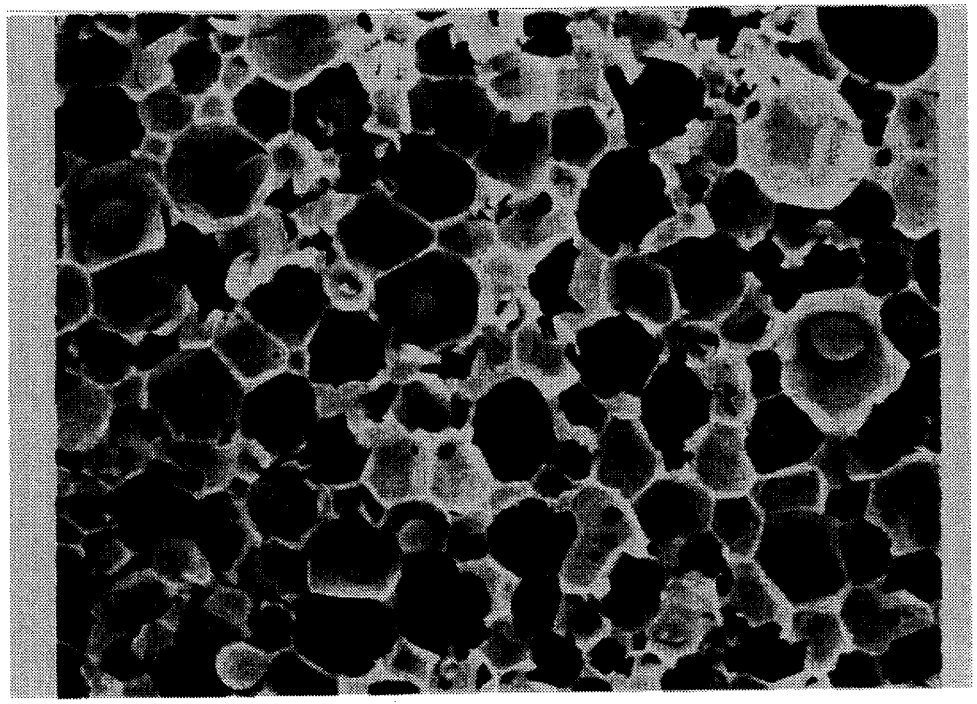
FIG. 6A is an enlarged photographic view of foam material to which powdered adhesive has been applied by a prior art sprinkling process.
Figure 6B:
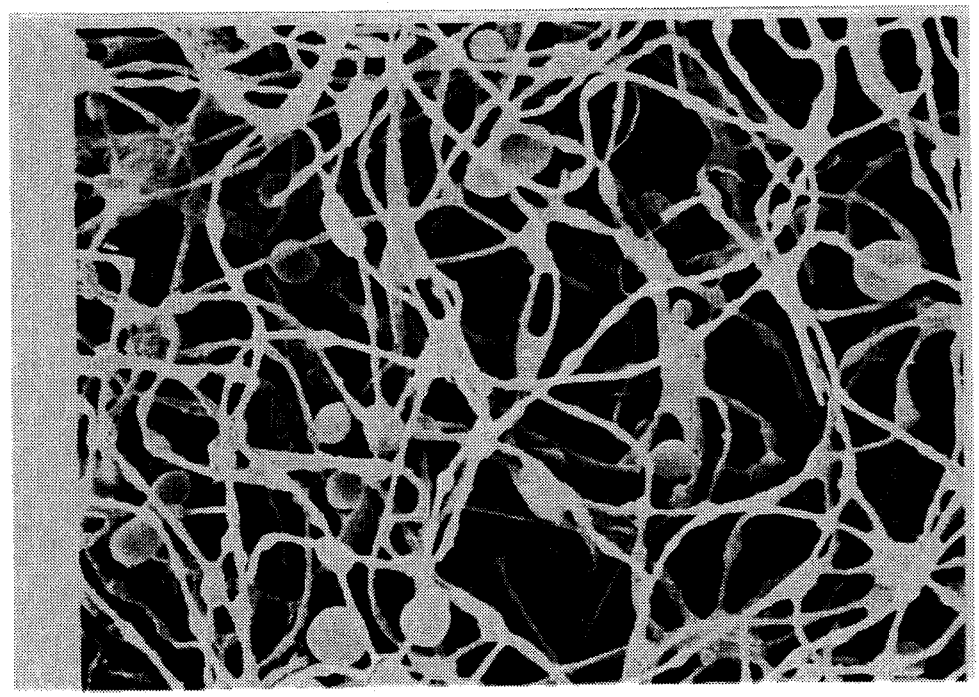
FIG. 6B is an enlarged photographic view of fibrous material to which powdered adhesive has been applied by a prior art sprinkling process.

FIG. 6A is an enlarged view of the same foam material of FIG. 5A in which the same adhesive was sprinkled upon the top surface of the material and conveyed below a radiant heater in accordance with a prior art method. It can be observed that a major portion of the adhesive (ball or egg shaped) has fallen into the cell structure of the foam and is no longer available on the surface to provide a quality lamination. FIG. 6B is similar to FIG. 6B but in which the adhesive is applied to fibrous material by the same prior art method of simply sprinkling on the top surface and heating. It will be seen that a major portion of the adhesive (ball or egg shaped) has fallen into the fibrous structure of the mat rather than remaining on the surface.

We claim:

1. A method of surface-coating a semirigid, porous layer of foam or fibrous material with an adhesive which is capable of subsequently being reactivated so that it may be adhered to a decorative trim panel of the like comprising the steps of:

(a) providing an elongated support belt having a support surface coated with a release agent which seals the support surface and renders it substantially non-porous, (b) advancing the support belt lengthwise along a predetermined path past a preheating station, a heating station, a loading station, a cooling station and an unloading station in sequence, (c) in advance of said preheating station sprinkling dry powdered thermoplastic adhesive in discrete particle form on the release agent coated surface of the advancing support belt, (d) at said preheating station plasticizing the adhesive on the release agent coated surface of the support belt by heating the adhesive to its plasticizing temperature but below its activating temperature to render it tacky and cause the adhesive particles to adhere to the release agent coated surface of the support belt in a uniform, non-continuous pattern rather than as a continuous film, (e) at said loading station placing the semi-rigid porous layer of material on the release agent coated surface of the support belt in contact with the adhesive, (f) providing an elongated compression belt having an outer compression surface, (g) positioning said compression belt in closely spaced relation above said support belt with said compression surface facing said support surface, (h) advancing said compression belt lengthwise along said predetermined path in unison with said support belt so that said compression belt cooperates with said support belt in advancing the material through the heating station, from the heating station to the cooling station and through the cooling station, (i) heating said adhesive at the heating station to a temperature above its plasticizing temperature to activate the adhesive and cause it to adhere to and coat the surface of the porous layer of material with only minimal penetration into the body of the material and without appreciably decreasing the porosity of the material, (j) compressing said adhesive coated material between said belts under adjustable predetermined pressure as the adhesive coated material advances through the heating station, continuing to compress the adhesive-coated material as it advances from said heating station to said cooling station and through said cooling station, (k) cooling said adhesive-coated material under pressure at said cooling station to
      (i) solidify the adhesive,
      (ii) adhere the fibers together, and
      (iii) release any adhesive adhering to said support belt, and (l) removing the adhesive-coated material at said unloading station.

2. The method according to claim 1, and further including the step of applying moisture to the release agent coated surface of the advancing support belt before the adhesive is sprinkled thereon.

3. The method according to claim 2, wherein said adhesive when applied has a particle size of about 0–600 microns.

4. The method according to claim 2, wherein said adhesive when applied has a particle size of about 200–500 microns.

5. The method according to claim 2, wherein the adhesive is a thermoplastic polyamide.

6. The method according to claim 5, wherein said adhesive when applied has a particle size of about 200–500 microns.

* * * * *